United States Patent [19]

Severinsson

[11] Patent Number: 5,405,293
[45] Date of Patent: Apr. 11, 1995

[54] DEVICE FOR TRANSMITTING TORQUE BETWEEN TWO ROTATABLE SHAFTS

[75] Inventor: Lars M. Severinsson, Hishult, Sweden

[73] Assignee: Ipumatic AB, Sweden

[21] Appl. No.: 91,442

[22] Filed: Jul. 15, 1993

[30] Foreign Application Priority Data

Jul. 20, 1992 [SE] Sweden .................. 9202200

[51] Int. Cl.[6] ........................................ F16D 43/284
[52] U.S. Cl. ........................................ 464/2; 192/35; 192/103 F
[58] Field of Search .............. 464/2, 160; 192/35, 192/103 F

[56] References Cited

U.S. PATENT DOCUMENTS

| | | | |
|---|---|---|---|
| 3,987,689 | 10/1976 | Engle | 74/711 |
| 4,905,808 | 3/1990 | Tomita et al. | 192/85 |
| 5,036,963 | 8/1991 | Murata | 192/35 |

Primary Examiner—Daniel P. Stodola
Assistant Examiner—Thomas E. Dunn
Attorney, Agent, or Firm—Laurence R. Brown

[57] ABSTRACT

A device for transmitting torque between two rotatable shaft members (2, 3) in a stationary housing (1) contains a number of alternate clutch discs (10, 11) engageable to counteract differential rotational speed between the two shaft members, to which they are connected, a hydraulic clutch piston (12) to engage the clutch discs and a hydraulic pump arrangement (15-24) driven by the speed differential between the two shaft members. An annular control piston (15) is axially movably arranged in the housing and is in contact with control pins (17), which are rotatable together with one of the shaft members (3) and cooperate with a cam curve (20) in the other shaft member (2) in such a way that the control pins and thus the control piston are imparted an oscillating movement with a frequency directly proportional to the rotational speed differential between the two shaft members.

8 Claims, 3 Drawing Sheets

DEVICE FOR TRANSMITTING TORQUE BETWEEN TWO ROTATABLE SHAFTS

TECHNICAL FIELD

This invention relates to a device for transmitting torque between two rotatable, generally aligned shafts, the device containing in a stationary housing two rotatable shaft members for connection to said shafts, a number of alternate clutch discs connected to the two shaft members and engageable to counteract differential rotational speed between the shaft members, at least one hydraulic clutch piston to engage the clutch discs, and a hydraulic pump arrangement driven by the speed differential between the two shaft members, the high-pressure side of the pump arrangement being connected to the clutch piston.

TECHNICAL BACKGROUND

Devices of the kind described above are known from different patent publications, one good example being U.S. Pat. No. 3,987,689, where the two shafts are the output shafts of a vehicle differential mechanism. The device may accordingly in this case be called a differential brake. There may, however, be other instances when it is desired to counteract a certain rotational speed differential between two shafts, a typical example being the two shafts to the driven front and rear axle, respectively, of a four-wheel-drive vehicle.

Whereas the above-mentioned patent publication shows a "speed-sensitive differential mechanism" and the present invention is applied to the more general case with two axially aligned shafts, the same general considerations apply.

Although U.S. Pat. No. 3,987,689 may be seen as the closest known prior art, there are other publications suggesting neighbouring solutions to the problem of decreasing undesired rotational speed differential between two shafts, such as EP-A-0 350 044, EP-B-0 368 893, U.S. Pat. No. 4 012 968, U.S. Pat. No. 3,488,980 and U.S. Pat. No. 5,087,228.

In a copending patent application from the applicant (SE 9201564-3) two embodiments of a device as defined above are shown. In that case the invention is directed to a controllable restriction in the hydraulic connection from the clutch piston back to the low-pressure side of the pump arrangement for obtaining full control over different parameters or characteristics in a device of this kind.

However, both these embodiments are relatively complex in the design of the hydraulic pump arrangement and its operation.

THE INVENTION

The main object of the invention is to attain a device of the kind defined above with a hydraulic pump arrangement and operating means therefore, which are simple and compact but still reliable. This is according to the invention accomplished in that one or more control pistons of the hydraulic pump arrangement are axially movably arranged in the housing and are in contact with one or more control members, which are rotatable together with one of the shaft members and cooperate with a cam curve of the other shaft member in such a way that the control members and thus the control pistons are imparted an oscillating movement with a frequency directly proportional to the rotational speed differential between the two shaft members.

In a preferred embodiment control members in the form of control pins extend radially inwardly from a control ring, which is in contact with the control pistons, through an annular part of one of the shaft members into a cam curve in the form of a circumferential groove in the other shaft member, the first mentioned shaft member being provided with oblong, axial openings for allowing relative axial movement of the control pins.

In the preferred embodiment the device is provided with one annular control piston, which is axially movable in the housing and with which the control ring is in rotatable engagement. With proper sealing means, however, it should be possible to have also the control piston rotating.

The control piston is preferably provided with circumferential steps so as to form a so called differential piston, which is axially movable in a housing bore with a corresponding shape, the arrangement with hydraulic chambers in the housing at said steps being such that a pumping action from the piston is achieved in both movement directions thereof.

By the provision of this differential piston instead of single-acting pistons, also the advantage with only one non-return valve in the inlet to and one in the outlet from the pump arrangement is obtained.

Alternatively, a number of circumferentially distributed control pistons, which are axially movable in the housing, may be employed. Each of these control pistons may be of the single-acting type or the differential type described above.

In the embodiments hitherto described the control members have been radially arranged. However, a modified device is characterized in that the control members in the form of control pins extend axially from an axial bearing in contact with the control piston, which is biassed by a spring in the direction towards the control pins, through a radial part of one of the shaft members to a circular cam curve in a radial part of the other shaft member.

BRIEF DESCRIPTION OF THE DRAWINGS

The invention will be described in further detail below under reference to the accompanying drawings, in which.

DESCRIPTION OF PRACTICAL EMBODIMENTS

Figure 1:
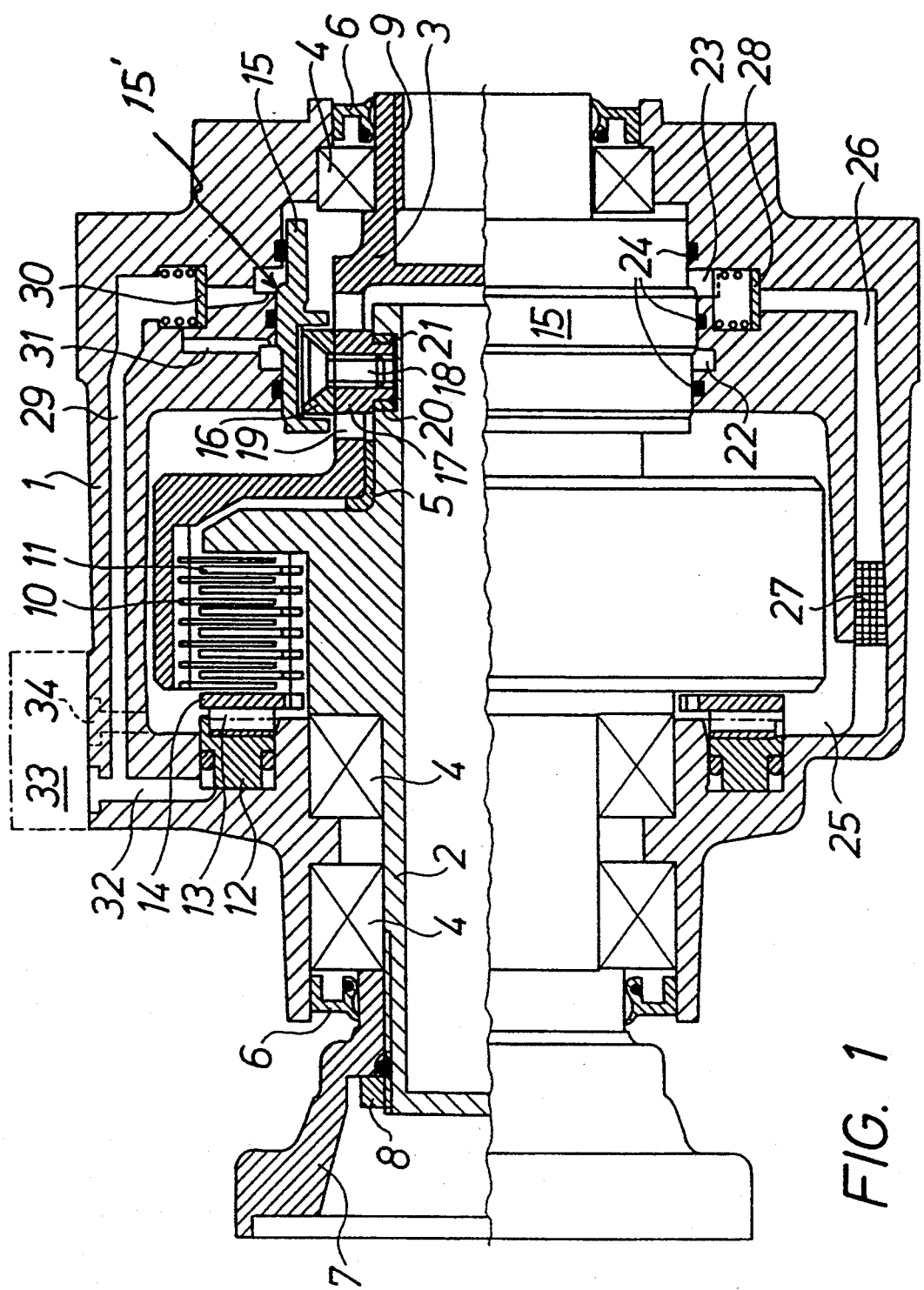
FIG. 1 is a cross-sectional view of a preferred embodiment of the invention.

In a stationary housing 1 two shaft members 2 and 3 are rotatably journalled by means of bearings 4. The left shaft member 2 extends into the right shaft member 3, and in the shown case there is a slide bearing 5 between them. Sealings 6 are provided between the housing 1 and the respective shaft members 2 and 3.

The two shaft members 2 and 3 are to be connected to two shafts (not shown); for this purpose the left shaft member 2 is provided with an attachment flange 7 held in place by a nut 8, whereas the right shaft member 3 is provided with an internal spline 9. The internal journalling and arrangement is such that no relative axial movements will occur or be permitted between the two shaft members 2 and 3.

A number of alternate clutch discs or rings 10 and 11 are splined to the left shaft member 2 and the right shaft member 3, respectively, to counteract—when engaged—differential rotational speed between the two shaft members. The stack of clutch discs will be referred to as the clutch 10, 11 below.

The clutch 10, 11 can be activated to clutch the two shaft members 2 and 3 together by means of a ring-shaped clutch piston 12, axially movable in the housing 1. Due to the fact that this piston 12 is arranged in the stationary housing 1 and the clutch 10, 11 which it is to engage is rotatable, there is an axial bearing 13 and a ring 14 to activate the clutch. If this clutch piston 12 is pushed to the right in the drawing in a way to be described, the clutch 10, 11 will be engaged, but otherwise free relative rotation between the shaft members 2 and 3 is permitted. The clutch piston 12 is sealed in its cylinder.

An annular control piston 15 is axially movable in the housing 1 (and may be rotationally locked relative thereto). For a purpose to be described it has differing diameters along its axial length. As the bore for the control piston 15 in the housing 1 has a corresponding shape, the stroke of the piston is inherently limited, but as appears below this stroke is also controlled by other means.

A control ring 16 (also shown with associated means in FIGS. 2 and 3) is rotatably arranged in an internal recess in the control piston 15 and may for that purpose be provided with bearings. Extending radially inwardly from the control ring 16 are a number of control pins 17. In the shown case this number is three as appears in FIG. 3, but any number from one and upwards is possible. Each control pin 17 is in the shown case attached to the control ring 16 by means of a screw 18.

Each control pin 17 extends through an oblong, axial opening 19 in the right shaft member 3 down into a circumferential groove 20 (to be described) in the left shaft member 2. For the cooperation with this groove 20 the lower end of the control pin 17 may be provided with a rotatable ring 21.

Figure 2:
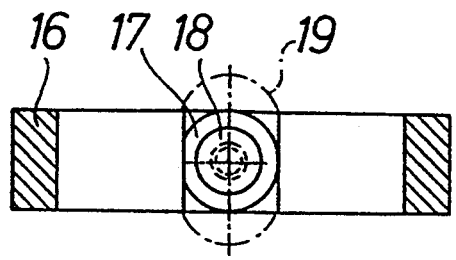
FIGS. 2 and 3 are a top view and a side view, respectively, of details in this embodiment.

The width of the oblong opening 19 in the right shaft member 3 is smaller than the diameter of the control pin 17, which as appears in FIG. 2 is canted in order to increase the cooperating surfaces. The width of the groove 20 in the left shaft member 2 substantially corresponds to the diameter of the ring 21 on the control pin 17.

The groove 20 does not describe a circumferential straight line around the left shaft member 2. It has instead a certain shape, for example sinusoidal or saw tooth shaped or any other suitable shape, so that—at relative movements—the control pin 17 will have to follow a winding path in the groove 20, imparting at circumstances described below an axial movement back and forth to the control piston 15.

If the two shaft members 2 and 3 rotate with the same rotational speed, the control ring 16 with its control pins 17 will only rotate in the control piston 15 and not transmit any axial movement thereto. If on the other hand there is rotational speed differential between the two shaft members 2 and 3, the control pin 17 (with its ring 21) will be forced to follow the groove 20 in the left shaft member 2 with a speed determined by the rotational speed differential between the shaft members 2 and 3, at the same time as it moves back and forth in the oblong opening 19 in the right shaft member 3. The result is that the control piston 15 is given an axial movement back and forth, the frequency of which is directly proportional to the rotational speed differential between the two shaft members 2 and 3.

In the housing 1 at the control piston 15 there are two circumferential grooves forming two hydraulic chambers 22 and 23. Sealings 24 are provided around these chambers 22 and 23 in the housing 1. (Alternatively these sealings may be provided in the piston 15.)

An intermediate part 15' of the control piston 15 has a greater diameter than the remainder of the piston. The diameter difference is greater in relation to the piston part to the right (at the chamber 23) than to the left (at the chamber 22). The resulting displacement or piston area is about twice as big at the right chamber 23 as at the left one 22.

The result hereof is that when the control piston 15, which may be called a differential piston, moves to the right from its shown neutral position, the volume of the hydraulic chamber 23 will be decreased, whereas on the other hand the volume of the chamber 22 will be decreased when the piston 15 moves to the left.

The lower part of the housing 1 serves as a reservoir 25 for oil. From this reservoir an inlet conduit 26, provided with a filter 27, leads to the hydraulic chamber 23. Close to this chamber 23 the conduit 26 is provided with a non-return valve 28.

A similar outlet conduit 29 leads from the hydraulic chamber 23. Also this conduit is provided with a non-return valve 30 close to the chamber 23. The other hydraulic chamber 22 is connected to the outlet conduit 29 upstream from the non-return valve 30.

The outlet conduit 29 is connected to a conduit 32, which is arranged between the clutch piston 12 and a pressure-reducing valve 33, only indicated as a "black box". A return conduit 34 leads from the pressure-reducing valve 33 back to the oil reservoir 25 in the housing 1.

The pressure-reducing valve 33 may be of any suitable type. Preferably it is of the type where a frusto-conical part of a movable valve body cooperates with a shoulder, the position of the valve body being governed by an electrically controlled solenoid.

The hydraulic pressure in the conduit 32 may accordingly be reduced at will by the pressure-reducing valve 33.

From the description above it has become clear that when there is a rotational speed differential between the two shaft members 2 and 3, the control piston 15 will be given an axial movement back and forth, and that the frequency of this movement is directly proportional to this speed differential.

The effect of this axial movement is as follows: Provided that the control piston 15 is at its position to the extreme right, a movement to the left thereof means that the volume of the right hydraulic chamber 23 increases and accordingly that oil is sucked into the chamber 23 from the reservoir through the inlet conduit 26 past the non-return valve 28. At the same time the volume of the left hydraulic chamber 22 decreases, so that oil is pressed through the conduit 31 to the outlet conduit 29.

In the next phase, when the control piston 15 moves to the right, the volume of the right hydraulic chamber 23 decreases, whereas that of the left chamber 22 increases, which means that oil is pressed past the non-return valve 30 from the right chamber 23 to the outlet conduit 29 but also to the left chamber 22 through the conduit 31.

Due to the fact that the displacement at the right chamber 23 is twice that at the left one 22, the effect in the outlet conduit 29 is the same, irrespective of the movement direction of the control piston 15.

In other words, the effect of the relatively simple arrangement shown in FIG. 1 is the same as if each chamber 22 and 23—with the same displacement—was provided with its own inlet conduit, having a non-return valve, and its own outlet conduit, likewise having a non-return valve.

The hydraulic pressure built up in the outlet conduit 29 is transmitted—with the possible reduction provided by the pressure-reducing valve 33—to the clutch piston 12, engaging the clutch 10, 11 and reducing the rotational speed differential between the two shaft members 2 and 3.

Figure 3:
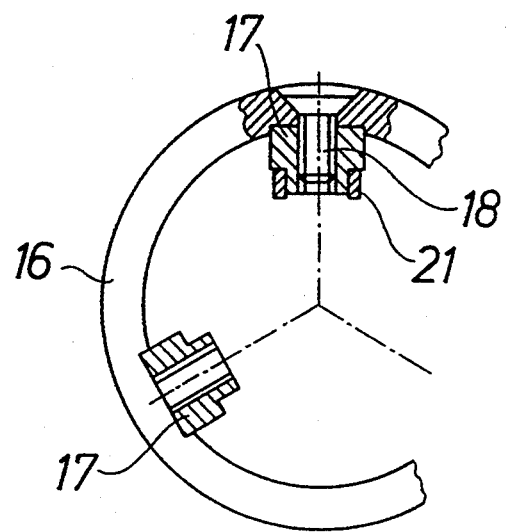
Figure 4:
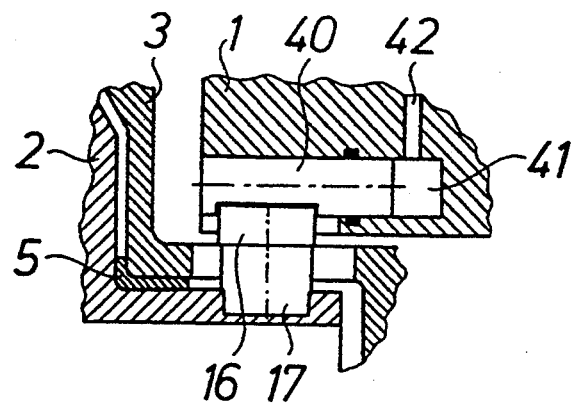
FIGS. 4–6 are detail views of modified embodiments.
Figure 5:
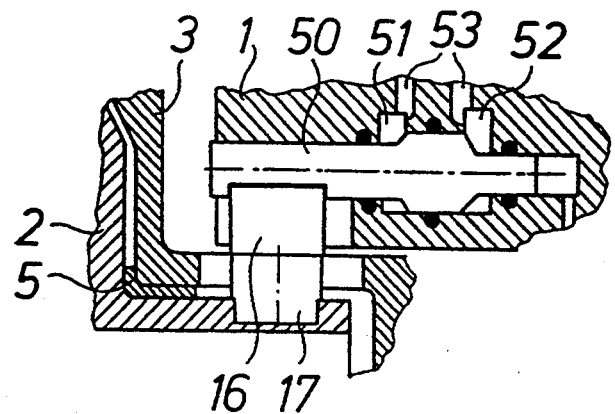
Figure 6:
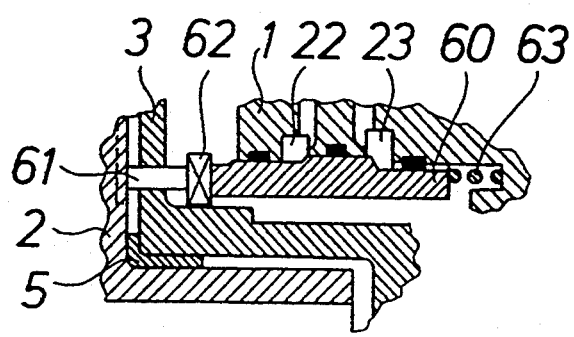

Modifications are shown in FIGS. 4–6. As far as possible the same numerals as in FIGS. 1–3 have been used for corresponding parts. Thus, in all these FIGS. 4–6 the following parts are identifiable: the housing 1, the left shaft member 2, the right shaft member 3 and the slide bearing 5, although these parts need not necessarily be identical to those of FIGS. 1–3.

In the modified versions according to FIGS. 4 and 5 the arrangement for imparting an oscillating movement to a control piston is virtually the same as in the preferred embodiment of FIGS. 1–3, which is reflected by the use in FIGS. 4 and 5 of the numerals 16 and 17 for a control ring and a control pin, respectively.

In the FIG. 4 modification the control ring 16 is connected to a number of single-acting control pistons 40, circumferentially arranged in corresponding cylinder bores in the housing 1. As is generally the case in the three modifications FIGS. 4–6, no inlet conduit to a hydraulic chamber 41 is shown, only an outlet conduit 42, eventually leading to the clutch operating means (see FIG. 1).

In the preferred embodiment of FIGS. 1–3 the control piston 15 is annular, whereas in the modified version according to FIG. 5 there is provided a number of circumferentially distributed differential control pistons 50 having the same general function as the control piston 15. Hydraulic chambers 51 and 52 with outlet conduits 53 are indicated. For a description of the function, reference is made to the description of the preferred embodiment according to FIGS. 1–3.

The main difference between the preferred embodiment according to FIGS. 1–3 and the modified one according to FIG. 6 is that in the latter case the annular control piston 60 is controlled by axial means instead of radial means as in all the previously described embodiments. A control pin 61 extends through a bore in the right shaft member 3 between an axial or circumferential cam curve on the left shaft member 2 and an axial bearing 62 at the left end of the control piston 60, which is biassed in the other direction by a compression spring 63 at its opposite end.

When the two shaft members 2 and 3 rotate with the same speed, the control pin 61 will be axially stationary, whereas at a rotational speed differential, the pin 61 and thus the control piston 60 will be imparted an axial oscillating movement by the cam curve of the left shaft member 2 and the spring 63.

The function of the control piston 60 is the same as that of the control piston 15 in the FIGS. 1–3 embodiment, and the two hydraulic chambers 22, 23 have the same numerals as in that embodiment.

The functional difference between the two embodiments according to FIGS. 1–3 and FIG. 6, respectively, is that in the first one the cam provides control or guiding in both axial directions for the control piston 15, whereas in the second one a separate spring 63 is required for moving the control piston 60 in one axial direction. The two piston types depicted in FIGS. 4 and 5 may as a further modification also be employed in the FIG. 6 embodiment.

I claim:

1. A device for transmitting torque between two rotatable generally axially aligned shafts comprising a stationary housing (1), two rotatable shaft members (2, 3) supported by said housing, a number of alternate clutch discs (10, 11) connected respectively to the two shaft members and engageable to counteract differential rotational speed between the shaft members, at least one hydraulic clutch piston (12) to engage the clutch discs, and a hydraulic pump arrangement (15-24; 40-42; 50-53; 60, 63) driven by the speed differential between the two shaft members, a high-pressure side of the pump arrangement being connected to the at least one hydraulic clutch piston, the combination comprising at least one control piston (15; 40; 50; 60) for a first one of said shaft members (3) is contained in the hydraulic pump arrangement (15-24; 40-42; 50-53; 60, 63) for movement in the housing (1), and in contact with a corresponding at least one control member (17; 61), said at least one control member being rotatable together with one of the shaft members and pumping control means including a cam curve (20) rotatable with the other shaft member (2) arranged to contact said at least one control member in such a way that the at least one control member and thus the at least one control piston are imparted an oscillating movement with a frequency directly proportional to the rotational speed differential between the two shaft members.

2. A device according to claim 1, wherein said other shaft member (2) forms the cam curve (20) as a circumferential groove, and wherein said at least one control member further comprises a control ring (16) having control pins (17) extending radially inwardly from the control ring (16), said control pins (17) being in contact with the at least one control piston (15; 40; 50) at an annular part of one of the shaft members (3) to contact said cam curve (20), said cam curve being in the form of a circumferential groove in the other shaft member (2), the first one of the shaft members (3) being provided through the annular part with oblong, axial openings (19) for allowing relative axial movement of the control pins.

3. A device according to claim 2, further comprising at least one annular control piston (15) axially movable in the housing (1) being in rotatable engagement with said control ring (16).

4. A device according to claim 3, characterized by circumferential steps on the at least one control piston (15) forming a differential piston, said differential piston being axially movable in a housing bore and pumping control means comprising hydraulic chambers (22, 23) in the housing (1) operable with said circumferential steps and the respective at least one control piston (15) to form a bidirectional pump.

5. A device according to claim 2, with a plurality of the at least one control piston being circumferentially arranged in corresponding cylinder bores in the housing (1) characterized in that the control ring (16) is in rotatable engagement with a number of the circumferentially distributed control pistons (40; 50) during axial movement within the housing (1).

6. A device according to claim 5, characterized in that each control piston (40) is a single-acting piston.

7. A device according to claim 5, wherein the housing has hydraulic chambers 51, 52 characterized in that each control piston (50) is provided with circumferential steps to form therewith a differential piston axially movable in a respective said housing bore with an arrangement of said hydraulic chambers (51, 52) and said circumferential steps forming a bi-directional pump.

8. A device according to claim 2, characterized in that the said at least one control member comprises respective control pin (61) extending axially from the at least one control piston (60), and a biasing spring (63) urging each control piston (60) in the direction towards the control pins (61), wherein the first one of the shaft members (3) has a radial part through which the control pins pass to engage said cam curve (20), said cam curve (20) further comprising a circular curve comprising a radial part of the other shaft member (2).

* * * * *